United States Patent
Grbovic (10) Patent No.: US 8,472,153 B1
(45) Date of Patent: Jun. 25, 2013

(54) NEUTRAL POINT CLAMPED POWER CONVERTER FAULT DETECTION, IDENTIFICATION, AND PROTECTION

(75) Inventor: Petar Jovan Grbovic, Ismaning (DE)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 13/330,807

(22) Filed: Dec. 20, 2011

(51) Int. Cl.
*H02H 3/00* (2006.01)

(52) U.S. Cl.
USPC .............................................. 361/18; 361/101

(58) Field of Classification Search
USPC ............................................ 361/18, 100, 101
See application file for complete search history.

(56) References Cited

U.S. PATENT DOCUMENTS

| | | | |
|---|---|---|---|
| 6,594,164 B2* | 7/2003 | Suzuki | 363/69 |
| 7,110,272 B2 | 9/2006 | Nojima | |
| 7,489,487 B2 | 2/2009 | Oka | |
| 2008/0204959 A1 | 8/2008 | Knapp et al. | |
| 2011/0140727 A1* | 6/2011 | Soldi et al. | 324/762.01 |

OTHER PUBLICATIONS

A. K. Jain et al., "VCE Sensing for IGBT Protection in NPC Three Level Converters-Causes for Spurious Trippings and Their Elimination," IEEE Transactions on Power Eectronics, vol. 26, No. 1, pp. 298-309; Jan. 2011.

F. Wang et al., "Failure-Mode Analysis and Protection of Three-Level Neutral-Point-Clamped PWM Voltage Source Converters," IEEE Transactions on Industry Applications, vol. 46., No. 2., Mar./Apr. 2010.

* cited by examiner

*Primary Examiner* — Danny Nguyen
(74) *Attorney, Agent, or Firm* — Cantor Colburn LLP

(57) ABSTRACT

A fault detection, identification, and protection system for a phase leg of a three-level neutral point clamped (NPC) power converter includes a fault detection circuit, the fault detection circuit configured to determine, based on signals received from the two inner switches and two outer switches via their respective gate drivers, the presence of a fault in the phase leg; a fault identification circuit, the fault identification circuit being configured to determine, based on signals from the fault detection circuit, a location of the fault in the phase leg; and a protection circuit, the protection circuit being configured to turn off at least one of the inner switches or outer switches in response to the identification of the location of the fault by the fault identification circuit.

20 Claims, 10 Drawing Sheets

NEUTRAL POINT CLAMPED POWER CONVERTER FAULT DETECTION, IDENTIFICATION, AND PROTECTION

BACKGROUND OF THE INVENTION

The subject matter disclosed herein relates generally to neutral point clamped (NPC) power converters, and, more particularly, to a method and apparatus for electrical fault detection, identification, and protection in a neutral point clamped (NPC) power converter.

Switching mode power converters are used in many applications, including industry applications, transportation, home appliances, and power production and transmission. A common topology for a switching mode power converter is a voltage source pulse width modulated converter with two-level or multilevel output pulse width modulated voltage. Neutral point clamped (NPC) power converters have become more common due to various advantages over two-level converters. A NPC power converter includes a direct current (DC) bus capacitor comprising two series connected capacitors. The NPC power converter may further include one or more phase legs, and each phase leg may include two NPC diodes. The NPC diodes are each directly connected to the DC bus capacitor midpoint. A NPC power converter provides good utilization of semiconductor switches in the NPC power converter, requiring relatively small passive components such as input capacitor filters and output inductors, and lowered voltage stress on the output filter and load.

NPC power converters may require relatively complex of control systems for the switches in the various phase legs. Additionally, fault detection and protection is a complex process. Without proper fault detection and protection the entire NPC power converter may be destroyed during fault conditions. Failure of an NPC power converter may include blocking capability collapse of a diode or breakdown of a semiconductor switch. A result of such a failure is may be a direct short circuit across an energized power capacitor, which is followed by high fault current that may be an order of magnitude higher than the device rated current. This type of fault does not result in immediate catastrophic failure. The remaining healthy devices in the NPC power converter can sustain this operating mode for limited time, shorter than about 10 microseconds ($\mu$s). This time limit is specified by the device manufacturer and must not be exceeded to avoid total failure of the NPC power converter. If appropriate protection is not applied during the time limit, the fault will propagate through the phase leg and the entire converter.

Fault detection in an NPC power converter may be based on the de-saturation effect, which is the ability of insulated gate bipolar transistor (IGBT) switches to limit fault current. The detection is based on the fact that the IGBT switch voltage is high if the current is higher than the saturation level of the switch. The fault is detected by measuring the collector emitter voltage of the switch. However, the detection circuit may not be able to determine exact position of the faulty device, or distinguish short circuit (SC) fault of a first device from an open circuit (OC) fault of a second device. The fault case when two devices fail in short circuit may also not be able to be identified. This may result in a postponed catastrophic failure of the NPC power converter due to improper diagnosis of fault conditions.

BRIEF DESCRIPTION OF THE INVENTION

In one embodiment, a fault detection, identification, and protection system for a neutral point clamped (NPC) power converter includes a phase leg of the NPC power converter, the phase leg comprising two NPC diodes, two inner switches with two associated inner diodes, and two outer switches with two associated outer diodes, each of the inner and outer switches of the phase leg having a respective gate driver, wherein each of the outer switches are connected to a respective bus of the phase leg, and the inner switches are connected in series between the two outer switches; a fault detection circuit, the fault detection circuit configured to determine, based on signals received from the two inner switches and two outer switches via their respective gate drivers, the presence of a fault in the phase leg; a fault identification circuit, the fault identification circuit being configured to determine, based on signals from the fault detection circuit, a location of the fault in the phase leg; and a protection circuit, the protection circuit being configured to turn off at least one of the inner switches or outer switches in response to the identification of the location of the fault by the fault identification circuit.

In another embodiment, a method for fault detection, identification, and protection system for a phase leg of a NPC power converter, the phase leg comprising two NPC diodes, two inner switches with two associated inner diodes, and two outer switches with two associated outer diodes, each of the inner and outer switches of the phase leg having a respective gate driver, wherein each of the outer switches are connected to a respective bus of the phase leg, and the inner switches are connected in series between the two outer switches includes detecting by a fault detection circuit the presence of a fault in the phase leg based on signals received from the two inner switches and two outer switches via their respective gate drivers; identifying by a fault identification circuit a location of the fault in the phase leg based on signals from the fault detection circuit; and turning off at least one of the inner switches or outer switches by a protection circuit in response to the identification of the location of the fault by the fault identification circuit.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In this invention, a fault detection, identification, and protection system for a NPC power converter, and a method to detect and identify a fault in a NPC power converter, and to protect the NPC power converter from the identified fault, is presented. Without proper fault detection, identification, and protection, consequences of a device failure in an NPC power converter may be catastrophic. The fault detection, identification, and protection system is associated with a single leg of a three-level NPC power converter; each phase leg may include a separate fault detection, identification, and protection system. Short circuit and open circuit fault of a NPC diode, inner switch, outer switch, and associated diodes may be detected and identified relatively quickly, for example within few us of a failure. The exact position of the failure in the NPC power converter can also be determined. The fault protection provided by the protection circuitry is determined as a function of the fault detection signals coming from the detection and identification circuitry.

Each phase leg of an NPC power converter includes four series connected switches with associated parallel-connected diodes and two NPC diodes. The switches are normally silicon (Si) based semiconductor switches that may use IGBT technology. The switches and associated diodes connected directly to the plus bus and the minus bus are referred as outer switches and diodes, while the switches and associated diodes connected to the phase leg output are referred as the inner switches and diodes. The phase leg input is the DC bus voltage, while the output is output current $I_{LOAD}$, which is provided at the phase leg midpoint. The detection circuitry uses signals from the phase modulator of the phase leg, and from the respective gate driver of each switch in the phase leg, to diagnose faults: the switch desaturation signal (DESAT), which indicates that the switch is in desaturation mode; $V_{CE\_LOW}$, which indicates whether the collector-emitter voltage of the switch is low; CLAMP, which indicates whether clamping is active in the switch; and pulse width modulation (PWM) signals from the phase modulator in the phase leg. There is no need to measure the collector current and output current of the switches; this reduces the complexity of the detection circuitry.

The detection circuitry may include three sub-circuits: a circuit for detection of an NPC diode short circuit or an outer switch open circuit; a circuit for detection of an NPC diode open circuit; and a circuit for detection of an inner switch short circuit, outer switch short circuit, or inner switch open circuit. The identification circuit determines the type (short circuit or open circuit) and specific location of the fault. The detection and identification circuits may comprise standard logic gates such as AND, OR, NOT, edge triggered latch and delay blocks in some embodiments, or programmable logic devices such as field programmable gate array (FPGA) devices in other embodiments. The detection and identification circuits generates a vector of fault signals that are provided to the protection circuit. The protection circuit determines the appropriate safety turn off sequence, where the safety turn off sequence is determined as a function on the fault signals vector that is received from the detection and identification circuits. The safety turn off sequence is a turn off sequence of the switches in the phase leg, which can ensure that the initial fault will be cleared and catastrophic failure prevented. The detection circuits may comprise any appropriate components, such as standard logic gates such as AND, OR, NOT, edge triggered latches, and delay blocks in some embodiments, and/or programmable logic devices such as field programmable gate array (FPGA) devices in other embodiments. The protection circuit generates a vector of four turn off signals, which may each be high or low; each turn off signal is input to a gate driver of the four respective gate drivers of the four switches in the phase leg.

Figure 1:
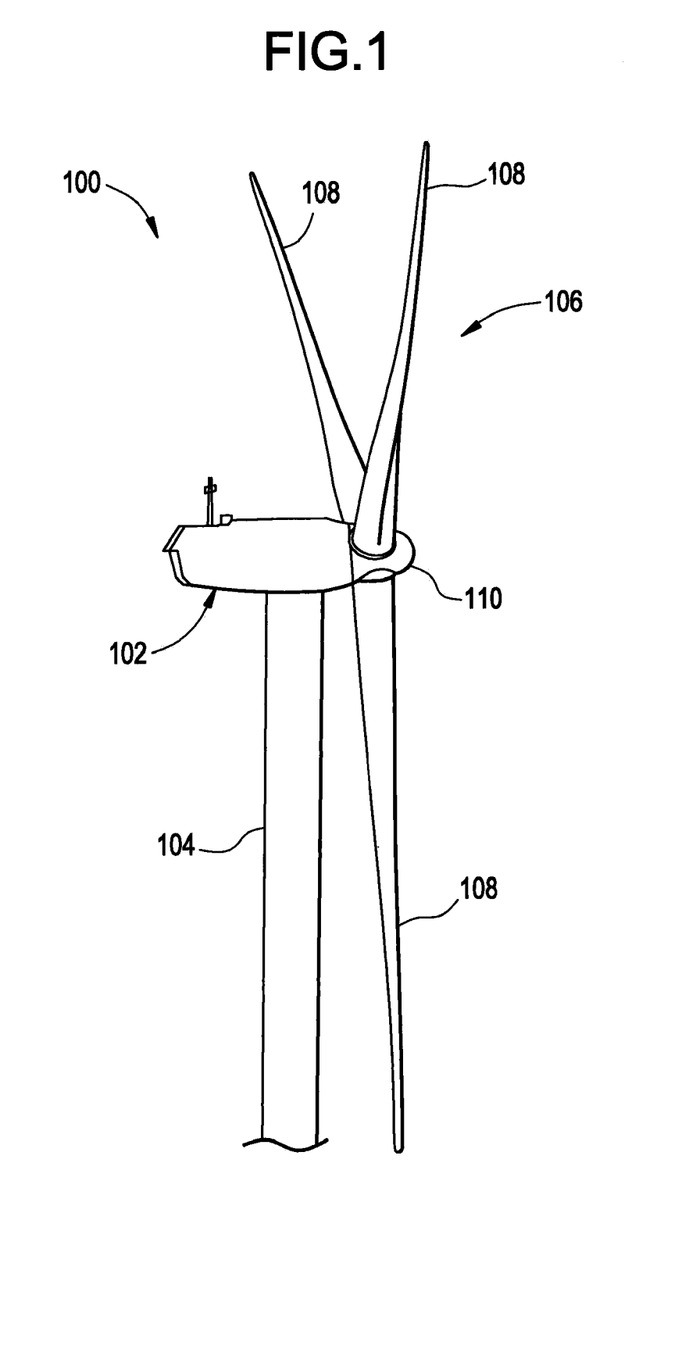
FIG. 1 is a perspective view of a portion of an exemplary wind turbine.

The fault detection, identification, and protection system may be implemented in a NPC power converter that is used in conjunction with any appropriate energy source, including but not limited to renewable energy sources such as wind and solar, industrial and transportation variable speed drives, or power distribution applications. FIG. 1 is a perspective view of a portion of an exemplary wind turbine 100 that may be used in conjunction with embodiments of a NPC power converter including a fault detection, identification, and protection system. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
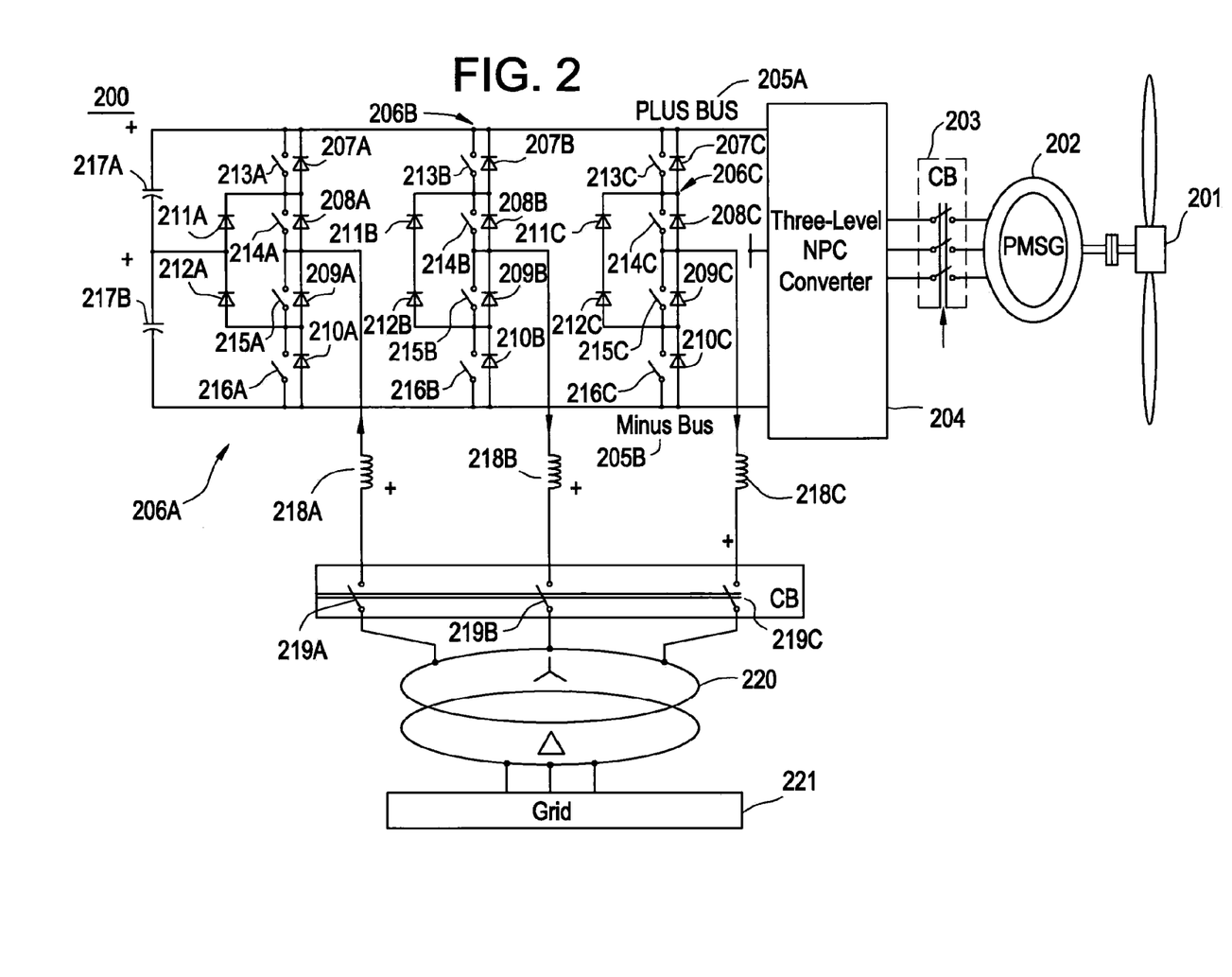
FIG. 2 is a block diagram of an embodiment of a three-level NPC power converter in a wind turbine system.

FIG. 2 shows an embodiment of a three-level NPC power converter incorporated into a wind turbine system 200. The wind turbine blades 201 are connected via a permanent magnet synchronous generator (PMSG) 202 and three switches 203 to the three-level neutral point clamped converter 204. The three-level NPC power converter 204 includes three phase legs 206A-C, which are connected between the plus bus 205A and the minus bus 205B, and DC bus capacitors 217A-B that are connected in series between the buses 205A-B in parallel with the three phase legs. Each phase leg includes 4 series diodes in parallel with 4 corresponding switches, and 2 NPC diodes. Phase leg 206A comprises series diodes 207A, 208A, 209A, and 210A; NPC diodes 211A and 212A; and switches 213A, 214A, 215A, and 216A. Phase leg 206B comprises series diodes 207B, 208B, 209B, and 210B; NPC diodes 211B and 212B; and switches 213B, 214B, 215B, and 216B. Phase leg 206C comprises series diodes 207C, 208C, 209C, and 210C; NPC diodes 211C and 212C; and switches 213C, 214C, 215C, and 216C. The NPC diodes 211A-C and 212A-C are each connected to the midpoint of the DC bus capacitors 217A-C, and the output of each phase leg 206A-C is located between the phase leg's respective NPC diodes 211A-C and 212A-C. Inductors 218A-C and switches 219A-C are each connected between an output of a respective phase leg 206A-C of the NPC power converter 204 to transformer 220 and power grid 221. Each phase leg 206A-C of FIG. 2 may include an associated fault detection, identification, and protection system, which is shown in further detail in FIG. 3.

Figure 3:
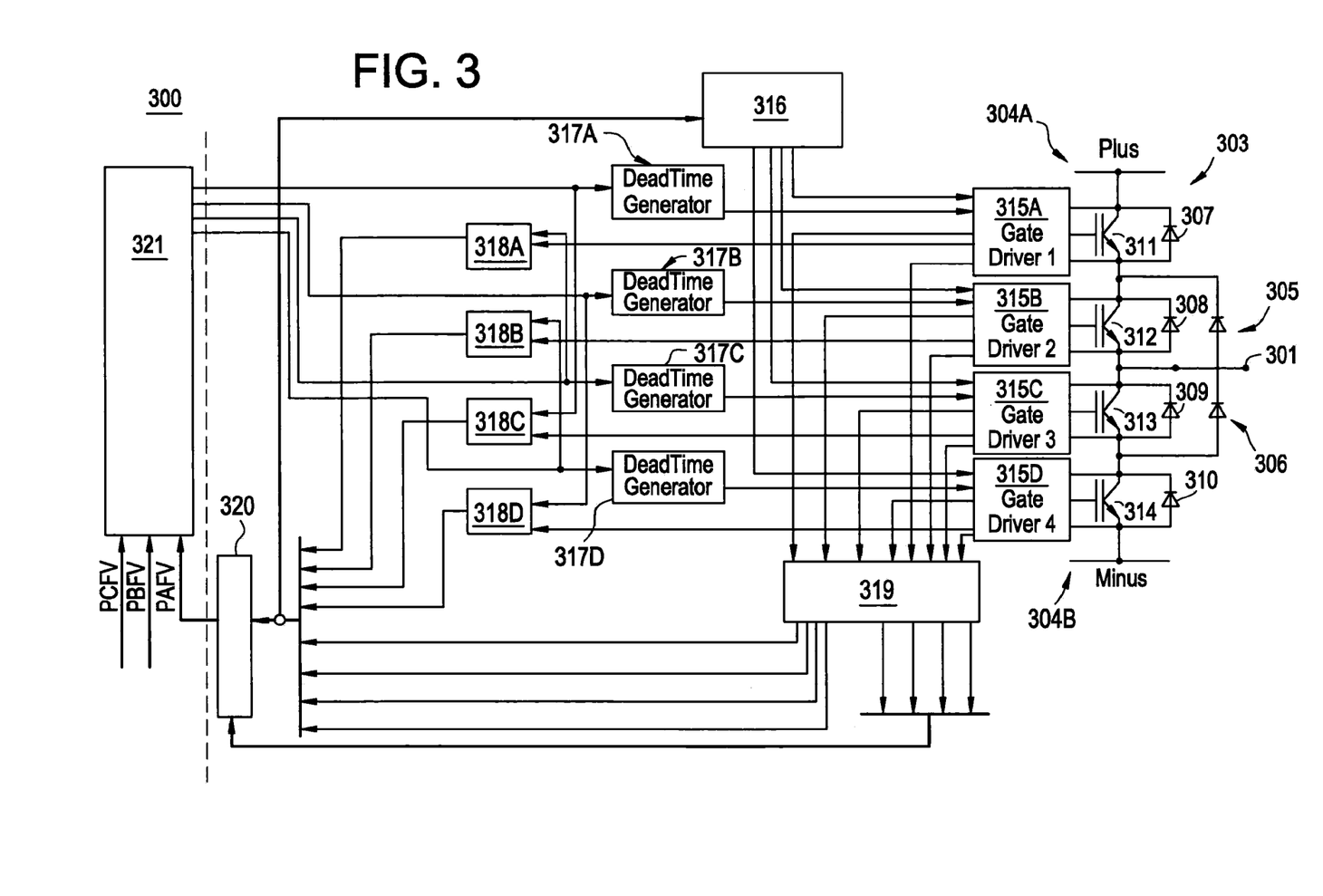
FIG. 3 is a block diagram of an embodiment of a fault detection, identification, and protection system for a single phase leg of a NPC power converter.

FIG. 3 is block diagram of a system 300 including a fault detection, identification, and protection system incorporated into a single phase leg 303 of a NPC power converter. Phase leg 303 may comprise any of phase legs 206A-C on NPC power converter 204 of FIG. 2. The phase leg includes four switches 311-314 and associated diodes 307-310, and two NPC diodes 305-306. The output of the phase leg 303 is located between the two NPC diodes 305-306. Each of switches 311-314 has a respective gate driver 315A-D (shown in further detail in FIG. 4). Switch 311 and associated diode 307, and switch 314 and associated diode 310, are connected directly on the DC buses 304A-B, and may be referred to as outer switches and diodes. Switch 312 and associated diode 308, and switch 313 and associated diode 309, may be referred to as inner switches and diodes. Phase modulator 321 generates PWM signals for the phase leg, which are provided to gate drivers 315A-D, switch fault detection modules 318A-D, and dead time generators 317A-D. NPC diode fault detection module 319 receives input signals from the gate drivers 315A-C. NPC diode fault detection module 319 is discussed in further detail below with respect to FIGS. 5 and 6. Switch fault detection modules 318A-D receive inputs from the gate drivers 315A-D, phase modulator 321, and the dead time generators 317A-D, and are discussed in further detail with respect to FIG. 7. Outputs from NPC diode fault detection module 319 and switch fault detection modules 318A-D are received by short circuit/open circuit fault detection module 320, which is discussed in further detail with respect to FIGS. 8A-B and 9A-B. Switch fault detection modules 318A-D, NPC diode fault detection module 319, and short circuit/open circuit fault detection module 320 comprise the fault detection and identification circuitry. Safety turnoff sequence management module 316 comprises the protection circuitry, and receives inputs from switch fault detection modules 318A-D, NPC diode fault detection module 319, and short circuit/open circuit fault detection module 320. Safety turnoff sequence management module 316 is discussed in further detail with respect to FIG. 10.

Various types of failures are may occur in the phase leg 303. For example, in short circuit failure of NPC diode 305, the DC bus capacitor 217A (shown in FIG. 2) is directly short circuited via switch 311 and failed NPC diode 305. In open circuit failure of NPC diode 305, switch 311 is stressed by over-voltage. In short circuit failure of switch 313, the DC bus capacitor 217A is directly short circuited via switches 311 and 312, and the NPC diode 306 and switch 313 are failed. In open circuit failure of switch 313, there is no stress on other components. In short circuit failure of switch 314, the DC bus capacitor 217B (shown in FIG. 2) is directly short circuited via switches 312 and 313, and the NPC diode 305 and switch 314 are failed. In open circuit failure of switch 314, there is no stress on other components. Short circuit failure of two complementary devices (for example switch 311 and diode 307, or switch 313 and diode 309), or short circuit failure of two neighbor devices (for example switch 312 and diode 308, or switch 314 and diode 310) may also occur. Each type of fault must be correctly identified and dealt with by the switch fault detection modules 318A-D, NPC diode fault detection module 319, short circuit/open circuit fault detection module 320, and safety turnoff sequence management module 316. Each fault must be detected, and the type of the fault and position of the failed device failed must be identified, in a relatively short time, for example within about 10 μs, to prevent failure of the NPC power converter. Once a fault is detected and identified, an appropriate safety turn off sequence is applied in order to safely clear the fault and prevent catastrophic failure of the entire converter. The various fault modes are discussed in further detail below.

Figure 4:
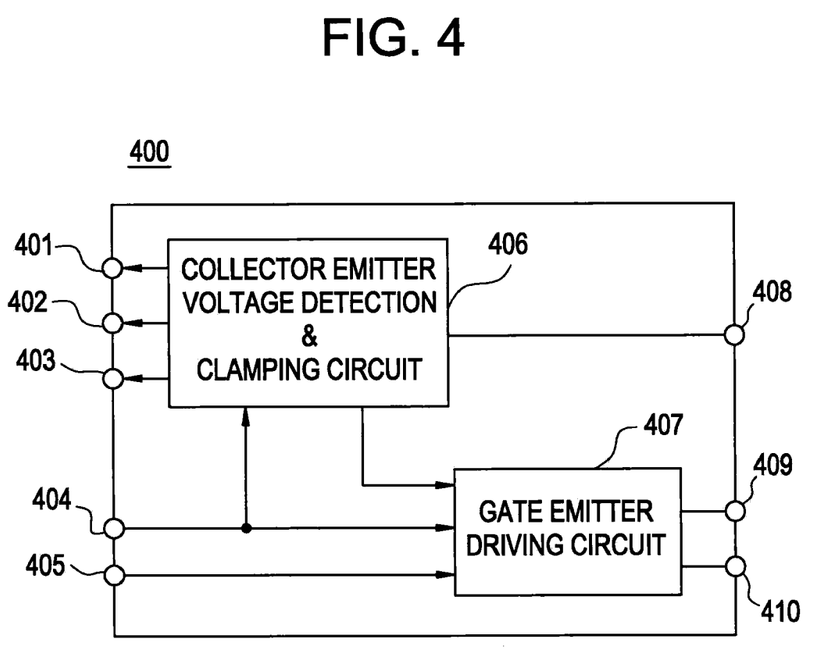
FIG. 4 is a block diagram of an embodiment of a gate driver for use in a NPC power converter.

FIG. 4 depicts block diagram of a gate driver 400, which generates a desaturation signal (DESAT), which indicates that the gate driver's associated switch is in desaturation mode; $V_{CE\_LOW}$, which indicates whether the collector-emitter voltage of the switch is low; CLAMP, which indicates whether clamping is active in the switch. Each of gate drivers 315A-D, which are associated with respective switches 311-314 as shown in FIG. 3, comprise a gate driver 400 as shown in FIG. 4. The gate driver 400 includes a gate emitter driving circuit 407 and a collector/emitter voltage detection and clamping circuit 406. The gate driver inputs are an input gate voltage 404 and safety turnoff 405, which are used to turn the gate driver's associated switch on and off. The signal outputs are DESAT 403, $V_{ce\_low}$ 402, and CLAMP 401. These outputs are used as inputs for the fault detection circuitry. Each of switches 311-314 has a respective DESAT 403, $V_{ce\_low}$ 402, and CLAMP 401 signal that may be received from the switch's respective gate driver 315A-D. The various signals output by gate drivers 315A-D will be referred to hereinafter as $DESAT_{311}$, $V_{ce\_low\_311}$, and $CLAMP_{311}$ from gate driver 315A of switch 311; $DESAT_{312}$, $V_{ce\_low\_312}$, and $CLAMP_{312}$ from gate driver 315B of switch 312; $DESAT_{313}$, $V_{ce\_low\_313}$, and $CLAMP_{313}$ from gate driver 315C of switch 313; and $DESAT_{314}$, $V_{ce\_low\_314}$, and $CLAMP_{314}$ from gate driver 315D of switch 314.

The NPC diode fault detection module 319 of FIG. 3 will now be discussed in detail. The NPC diode fault detection module 319 detects a NPC diode short circuit or an outer switch open circuit. An NPC diode 305/306 fails when it is turning off (reverse recovery) or reverse polarized, for example when an outer switch 311/314 is conducting. Once the NPC diode 305/306 is failed, the associated DC bus capacitor 217A/217B is directly short circuited via the associated outer switch 311/314 and faulty NPC diode 305/306. As the loop impedance is low, the fault current will be much higher than the nominal current and the associated outer switch 311/314 will be desaturated. The fault must be detected and cleared within 10 μs, otherwise the associated outer switch 311/314 will lose blocking capability and will be destroyed. The fault can be cleared by turning the associated outer switch 311/314 off. In the case of open circuit of an outer switch, the open circuit failure of an outer switch 311 or 314 may occur while carrying the load current or during commutation of the load current. In the either case, the load current will commutate to the complementary NPC diode 305/306.

Two faults, NPC diode short circuit and outer switch open circuit, result in the same fault signal. $FAULT_{305\_311}$ indicates a SC in NPC diode 305 or OC in switch 311, and $FAULT_{306\_314}$ indicates a SC in NPC diode 306 or OC in switch 314. An NPC diode short circuit can be detected if one and only one outer switch is de-saturated and its DESAT signal is active, as described by the following equations:

$$FAULT_{305\_311} = DESAT_{311} \& \neg (DESAT_{312} + DESAT_{313} + DESAT_{314}) \& DELAY[DESAT_{311} \& \neg (DESAT_{312} + DESAT_{313} + DESAT_{314})] \quad (EQ. 1)$$

$$FAULT_{306\_314} = DESAT_{314} \& \neg (DESAT_{311} + DESAT_{312} + DESAT_{313}) \& DELAY[DESAT_{314} \& \neg (DESAT_{311} + DESAT_{312} + DESAT_{313})] \quad (EQ. 2).$$

Figure 5:
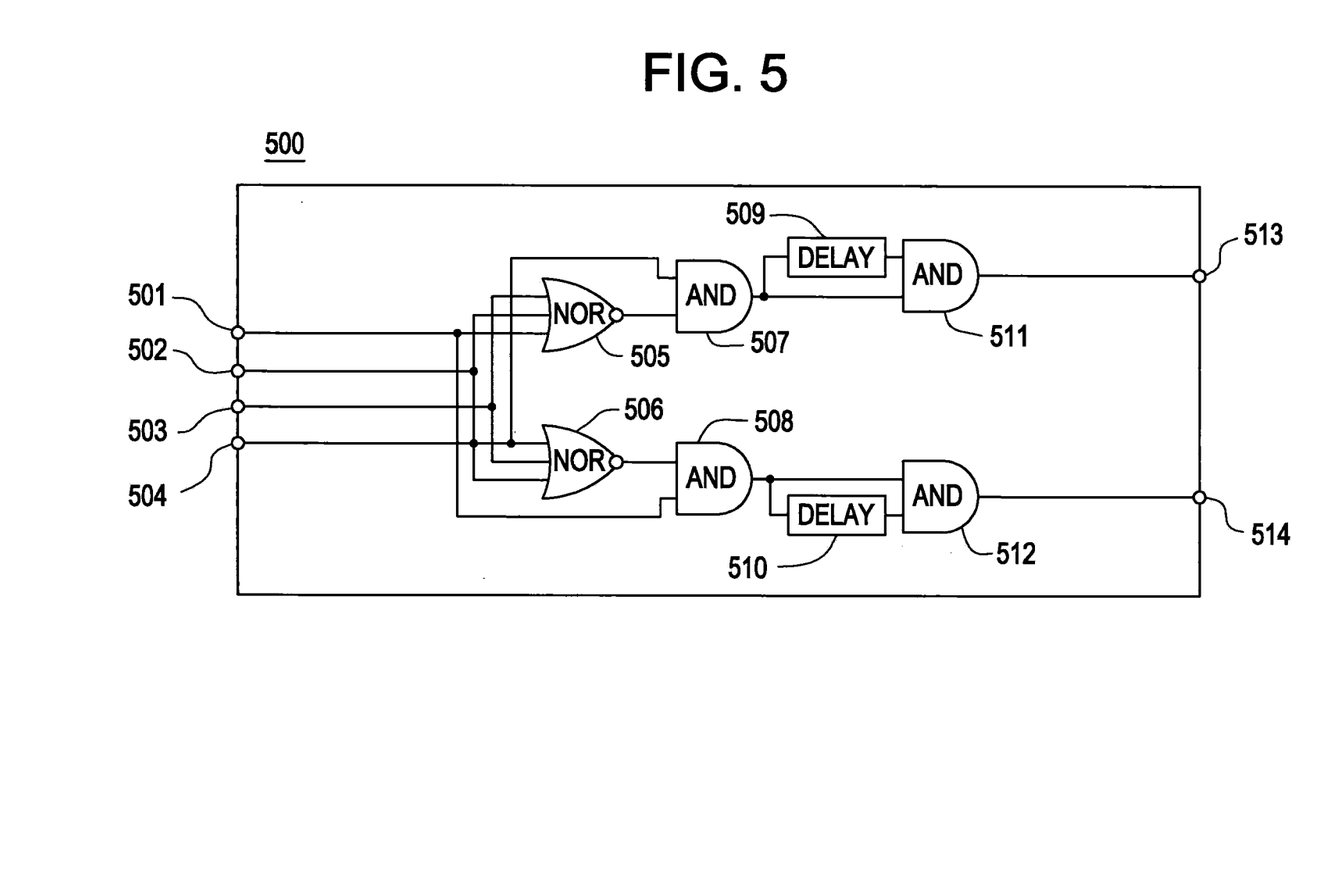
FIG. 5 is a block diagram of an embodiment of a logic circuit for detection of NPC diode short circuit or outer switch open circuit.

FIG. 5 illustrates an embodiment of a logic circuit 500 incorporating EQs. 1 and 2 for detection of the NPC diode short circuit or outer switch open circuit that may be implemented in the NPC diode fault detection module 319 in some embodiments. The circuit inputs are $DESAT_{311}$, which is received on input 501; $DESAT_{312}$, which is received on input 502; $DESAT_{313}$, which is received on input 503; and DESAT$_{314}$, which is received on input 504. The outputs of the logic circuit 500 are FAULT$_{305\_311}$ on output 513, which indicates a fault in either NPC diode 305 or switch 311, and FAULT$_{306\_314}$ on output 514, which indicates a fault in either NPC diode 306 or switch 314. The first part of the logic circuit 500 includes of NOR gates 505 and 506 and AND gates 507 and 508 is a detection circuit. The second part of the circuit composed of DELAY modules 509 and 510 and AND gates 511 and 512 is circuit that eliminates false short pulses. If the detection signal from AND gates 507/508 is shorter than the delay time defined by the DELAY modules 509/510, the pulse will be suppressed by the AND gates 511/512. This eliminates any false pulse that can be caused by noise, particularly commutation noise. FIG. 5 is shown for illustrative purposes only; EQs. 1 and 2 may be implemented in any appropriate type of circuitry to detect an NPC diode short circuit or outer switch open circuit.

NPC diode fault detection module 319 of FIG. 3 includes additional logic for detection of NPC diode open circuit faults. Open circuit failure of a NPC diode 305/306 may occur while carrying the load current or during commutation of the load current. In the both cases, the associated outer switch 311/314 is stressed with overvoltage. If appropriate protection is not applied, the switch will lose blocking capability and fail in short circuit. The fault can be cleared by turning the associated outer switch 311/314 off when the NPC diode open circuit fault is detected. An NPC diode open circuit fault can be detected if either CLAMP$_{311}$ or CLAMP$_{311}$, which are the clamping signals of the two outer switches 311 and 314, are active for certain time. The clamp signal CLAMP is active whenever the clamp circuit is actively clamping the collector emitter voltage of the switch. Depending on the design of the NPC power converter and the level of load current, clamping may be active whenever a switch turns off. To distinguish regular clamping action from clamping action due to the NPC diode open fault, all CLAMP pulses shorter than a certain time limit are suppressed. A minimum pulse width for detection of an NPC diode open circuit fault is defined as:

$$T_{clamp} = (L_c * I_{max})/(V_{clamp} - V_{busmax}) \quad \text{(EQ. 3)},$$

where $L_c$ is commutation loop inductance, $I_{max}$ is maximum commutation current, $V_{clamp}$ is the clamping level and $V_{busmax}$ is maximum DC bus voltage.

Figure 6:
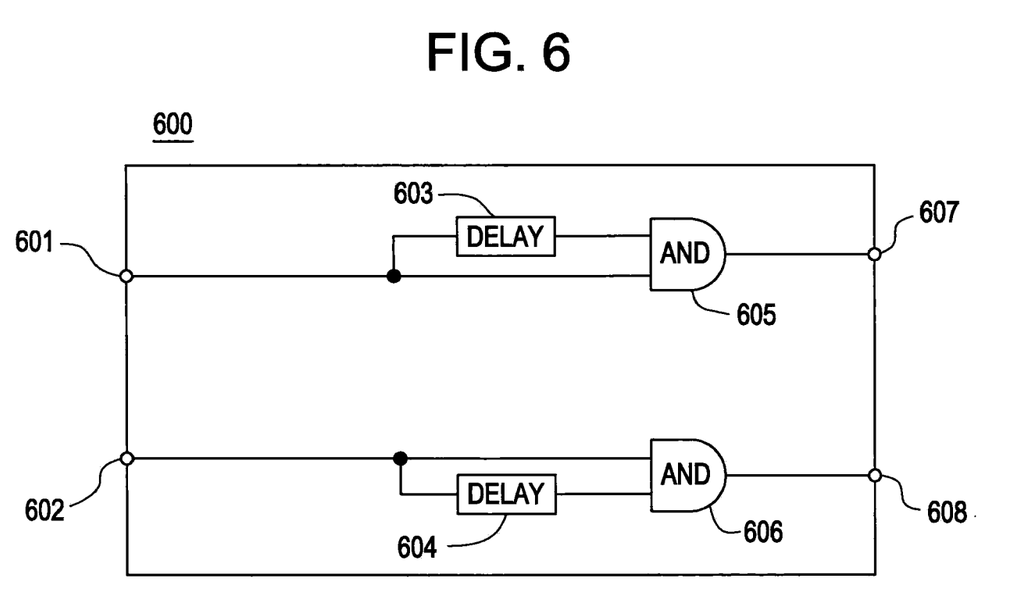
FIG. 6 is a block diagram of an embodiment of a logic circuit for detection of NPC diode open circuit fault.

FIG. 6 illustrates an embodiment of a logic circuit 600 for detection of the NPC diode open circuit fault that may be implemented in the NPC diode fault detection module 319 in some embodiments. The circuit inputs are CLAMP$_{311}$, which is received on input 601, and CLAMP$_{314}$, which is received on input 602. The outputs are OC$_{305}$ on output 607, which indicates an open circuit in NPC diode 305, and OC$_{306}$ on output 608, which indicates an open circuit in NPC diode 306. Short pulse suppression is performed by the delay modules 603/604 in conjunction with the AND gates 605/606, where the delay provided by delay modules 603/604 is greater than $T_{clamp}$ as defined in EQ. 3. FIG. 6 is shown for illustrative purposes only; EQ. 3 may be implemented in any appropriate type of circuitry to detect an NPC diode open circuit in NPC diode fault detection module 319.

The switch fault detection modules 318A-D are now discussed in detail. First, the various fault modes that are detected by the switch fault detection modules 318A-B are discussed. While these fault modes are detected by the switch fault detection modules 318A-D, the switch fault detection modules 318A-D does not distinguish between some fault modes.

The first fault mode is short circuit of an inner switch or diode. An inner switches 312/313 or inner diode 308/309 may short circuit when turning off or reverse polarized, for example when the top switch 311 and inner switch 312 are conducting. Once the inner switch or diode fails, the top DC bus capacitor 217A is directly short circuited via switches 311 and 312, NPC diode 306 and faulty inner switch or diode. As the loop impedance is low, the fault current will be much higher than the nominal current and the switches 311 and 312 will be desaturated. The fault must be detected and cleared in a relatively short time, for example within about 10 µs, otherwise the switches will lose blocking capability and will be destroyed. The fault may be cleared by turning the switch 311 off.

The second fault mode is open circuit of an inner switch. Open circuit failure of an inner switch 312/313 may occur while carrying the load current or during commutation of the load current. In the both cases, the load current will commutate to the complementary diode 308/309.

The third fault mode is short circuit of an outer switch or diode. The outer switches 311/314 or diodes 307/310 may fail in short circuit when turning off or reverse polarized, for example when the inner switches 312 and 313 are conducting. Once the outer switch/diode is failed, the DC bus capacitor 217B is directly short circuited via the switch 312, 313, NPC diode 305 and faulty switch/diode 314/310. As the loop impedance is very low, the fault current will be much higher than the nominal current and the switches 312 and 313 will be desaturated. The fault must be detected and cleared in a relatively short time, for example within about 10 µs, otherwise the switches will lose blocking capability and will be destroyed. The fault can be cleared by turning the switch 312 off.

The fourth fault mode is short circuit of two complementary switches/diodes, for example switch/diode pairs 311/307 or 313/309. The switches/diodes may fail when reverse polarized, for example when the inner switch 312 is conducting. Once the neighbor switch/diode fail, the DC bus capacitor 217A is directly short circuited via the switch 312, NPC diode 306 and faulty switches/diodes 311/307 or 313/309. As the loop impedance is very low, the fault current will be much higher than the nominal current and the switch 312 will be desaturated. The fault must be detected and cleared in a relatively short time, for example in a relatively short time, for example within about 10 µs, otherwise the switches will lose blocking capability and will be destroyed. The fault can be cleared by turning the switch 312 off.

The fifth fault mode is short circuit of two neighbor switches/diodes, for example switch/diode pairs 313/309 or 314/310. The neighbor switches/diodes may fail when reverse polarized, for example when the complementary switches 311 and 312 are conducting. Once the switches/diodes failed, the dc bus capacitors 218A/217B are directly short circuited via the switch 312, 312, NPC diodes 305 and 306 and faulty switch/diode 313/309 and 314/310. As the loop impedance is very low, the fault current will be much higher than the nominal current and switches 311 and 312 will be de-saturated. The fault must be detected and cleared in a relatively short time, for example within about 10 µs, otherwise the switches will lose blocking capability and will be destroyed. The fault can be cleared by turning switches 311 and 312 off. The turn off sequence is strictly defined: turn switch 311 off and then after a short delay turn switch 312 off.

Detection of the various fault modes by switch fault detection modules 318A-D is now discussed. Detection of switch short circuit faults is based on the following situations: the switch is on and the switch voltage is low, or the switch is off and the switch voltage is high. The first situation is used in desaturation detection. If the switch voltage is high and the switch is conducting, it means that the switch is desaturated (i.e., in short circuit) because the current is higher than saturation current. The second situation means that the switch is in short circuit. However, in some cases the switch may be off, but the switch's parallel diode may be conducting. In this case, the switch is off, but the switch voltage is low. Therefore, the detection logic may draw wrong conclusion that the device is in short circuit, which is not correct. To prevent such false fault detection, the detection logic must distinguish low voltage cause by the switch short circuit fault from low voltage caused by parallel diode conduction. The faults may be detected using the following inputs: $V_{CE\_LOW}$, which indicates whether switch voltage is low, the complementary PWM driving signal from the phase modulator 321, and the delayed complementary PWM signal, where the delay time is added by the dead time generators 317A-D shown in FIG. 3.

Short circuit detection for the inner switches 312 and 313 can be defined as $$SC_{312} = V_{CE\_LOW\_312} \& PWM_{314} \& DELAY(PWM_{314}) \quad (EQ. 4)$$

$$SC_{313} = V_{CE\_LOW\_313} \& PWM_{311} \& DELAY(PWM_{311}) \quad (EQ. 5).$$

Short circuit detection for the outer switches may be performed using similar logic as the inner switches. However, an outer switch can be in the same conditions even if the outer switch is not short circuited if there is an open circuit fault of the switch's complementary outer switch. In that case, the complementary outer diode (307 or 310) will be conducting the load current. Therefore, the switch voltage will be low because the diode is conducting, but the expected voltage is high. So, a false short circuit fault may be detected when the complementary inner switch is open circuited. Outer switch short circuit may therefore be determined based on three signals: the switch $V_{CE\_Low}$, the complementary outer switch DESAT, and the neighbor inner switch DESAT. These two additional signals may distinguish short circuit fault from open circuit fault. However, the short circuit detection must not rely on DESAT signals from the inner switches, because when an outer switch is short circuited, the fault current flows via the two series connected inner switches 312 and 313. In an ideal case, both of them will be desaturated and that will be detected. However, the switches may not be identical, having different saturation currents due to, for example, different junction temperatures. In this case, the switch with the lower saturation current will desaturate, while the other switch will stay fully saturated. As a consequence, only one DESAT signal will be detected. If short circuit detection is based on an AND function of the two DESAT signals, the fault will stay undetected, ending as a catastrophic failure of the phase leg and possibly the NPC power converter. Therefore, outer switch short circuit fault detection is performed based on the $V_{CE\_LOW}$ signals. The detection logic for a short circuit of an outer switch or an open circuit fault of an inner switch is:

$$FAULT_{311\_313} = V_{CE\_LOW\_311} \& PWM_{313} \& DELAY(PWM_{313}) \quad (EQ. 6)$$

$$FAULT_{314\_312} = V_{CE\_LOW\_314} \& PWM_{312} \& DELAY(PWM_{312}) \quad (EQ. 7).$$

The logic output signal $FAULT_{311\_313}$ indicates either a short circuit fault in switch 311 or an open circuit fault in switch 313. The logic output signal $FAULT_{314\_312}$ indicates either a short circuit fault in switch 314 or an open circuit fault in switch 312.

Figure 7:
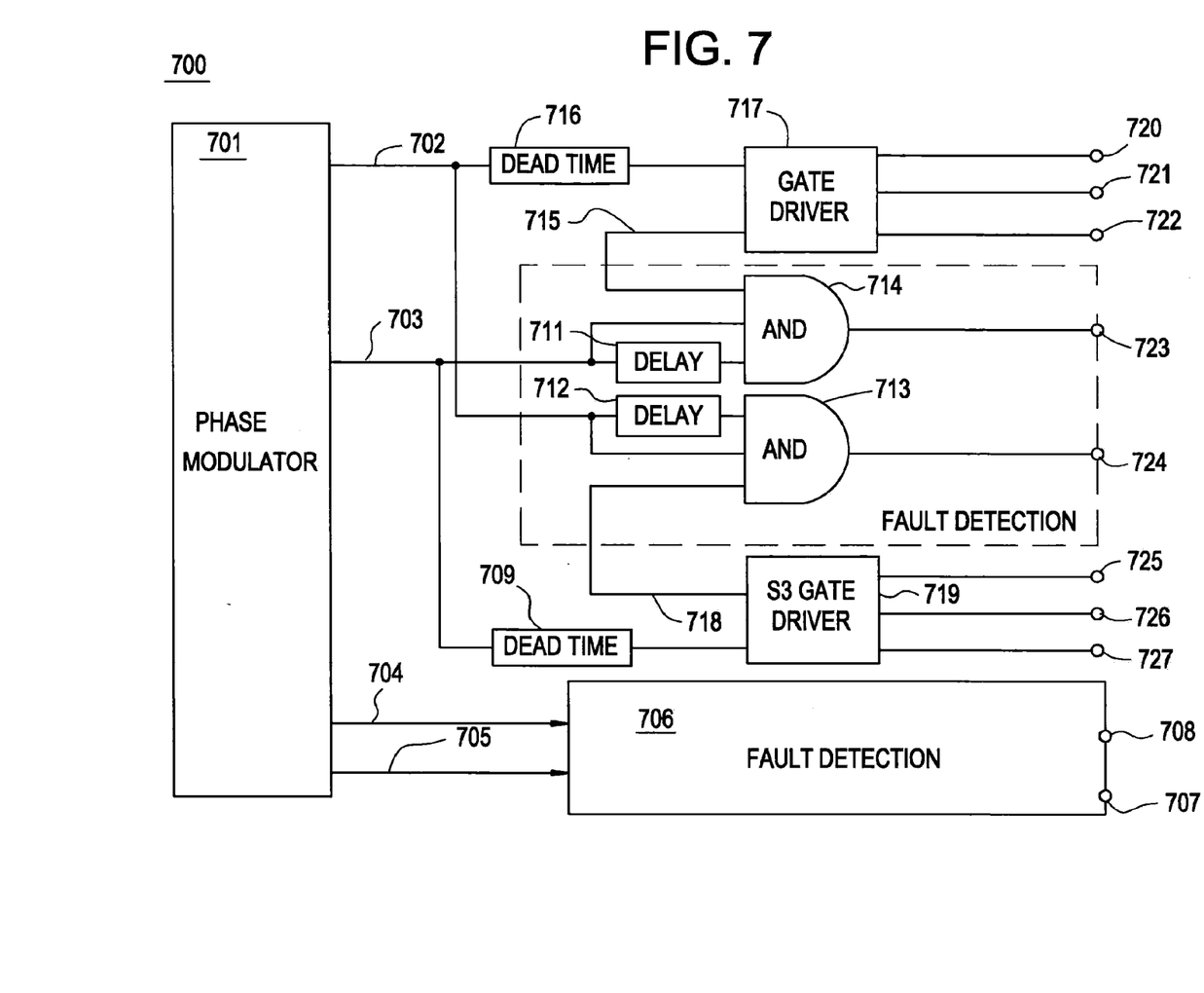
FIG. 7 is a block diagram of an embodiment of a logic circuit for detection of an inner or outer switch fault.

FIG. 7 shows an embodiment of a logic circuit 700 for detection of an inner or outer switch fault that may be implemented in a switch fault detection modules 318A-D in some embodiments. Logic circuit 700 comprises the switch fault detection modules 318A-D of FIG. 3 implemented as a single logic circuit. The inputs are PWM signals for each of switches 311-314 from the phase modulator 701, which corresponds to phase modulator 321 of FIG. 3. The PWM signal for switch 311 is received on input 702, and the PWM signal for switch 313 is received on input 703. The PWM signals for switches 312 and 314 are received on inputs 704 and 705, respectively. The logic 706 for switches 312 and 314 is identical to the logic shown for switches 311 and 313, which includes dead time generator 709, delay modules 711-712, AND gates 713-714, dead time generator 716, gate driver 717 which comprises gate driver 315A of switch 311 of FIG. 3, and gate driver 719 which comprises gate driver 315C of switch 313 of FIG. 3. The signals output from the respective gate drivers are also received as inputs: $V_{CE\_LOW\_311}$ on input 715, $V_{CE\_LOW\_312}$ by logic 706, $V_{CE\_LOW\_313}$ on input 718, and $V_{CE\_LOW\_314}$ by logic 706. The outputs are $SC_{313}$ on output 724, $SC_{312}$ on output 708, $FAULT_{311\_313}$ on output 723, and $FAULT_{314\_312}$ on output 707. Two faults, outer switch short circuit or inner switch open circuit, will result in the same fault signals (i.e., $FAULT_{311\_313}$ or $FAULT_{314\_312}$). FIG. 7 is shown for illustrative purposes only; EQs. 4-7 may be implemented in any appropriate type of circuitry to detect an inner or outer switch fault.

Short circuit/open circuit fault detection module 320 of FIG. 3 is now discussed in detail. The short circuit/open circuit fault detection module 320 receives inputs from NPC diode fault detection module 319 and switch fault detection modules 318A-D, and identifies the exact location of a fault based on these inputs. The signals received from NPC diode fault detection module 319 by short circuit/open circuit fault detection module 320 include $FAULT_{305\_311}$, $FAULT_{306\_314}$, $OC_{305}$, and $OC_{306}$. The signals received from switch fault detection modules 318A-D by short circuit/open circuit fault detection module 320 include $SC_{312}$, $SC_{313}$, $FAULT_{311\_313}$, and $FAULT_{314\_312}$. In particular, the short circuit/open circuit fault detection module 320 distinguishes between a fault in NPC diode 305 versus a fault in switch 311 indicated by $FAULT_{305\_311}$; between a fault in NPC diode 306 versus a fault in switch 314 indicated by $FAULT_{306\_314}$; between a fault in switch 311 versus a fault in switch 313 indicated by $FAULT_{311\_313}$; and between a fault in switch 314 versus a fault in switch 312 indicated by $FAULT_{314\_312}$.

To differentiate an outer switch open circuit fault from an NPC diode short circuit fault (NPC diode 305/switch 311 or NPC diode 306/switch 314), once short circuit fault of the NPC diode or open circuit fault of the outer switch is detected, the outer switch will be turned off immediately. With this action, catastrophic failure is prevented in case of NPC diode short circuit. If the fault is an open circuit fault of the outer switch, nothing will happen in the short term. However, once the fault has been cleared, the exact type of the fault can be determined using the switch CLAMP signal, so that an open circuited outer switch may be safely turned back on. NPC diode short circuit and the outer switch open circuit can be distinguished using the same method used to distinguish the outer switch short circuit from the inner switch open circuit. The detection logic is as follows:

$$SC_{305} = FAULT_{305\_311} \& CLAMP_{311} \quad (EQ. 8)$$

$$SC_{306} = FAULT_{306\_314} \& CLAMP_{314} \quad (EQ. 9)$$

$$OC_{311} = \neg (SC_{305}) \& FAULT_{305\_311} \quad (EQ. 10)$$

$$OC_{314} = \neg (SC_{306}) \& FAULT_{306\_314} \quad (EQ. 11).$$

Figure 8A:
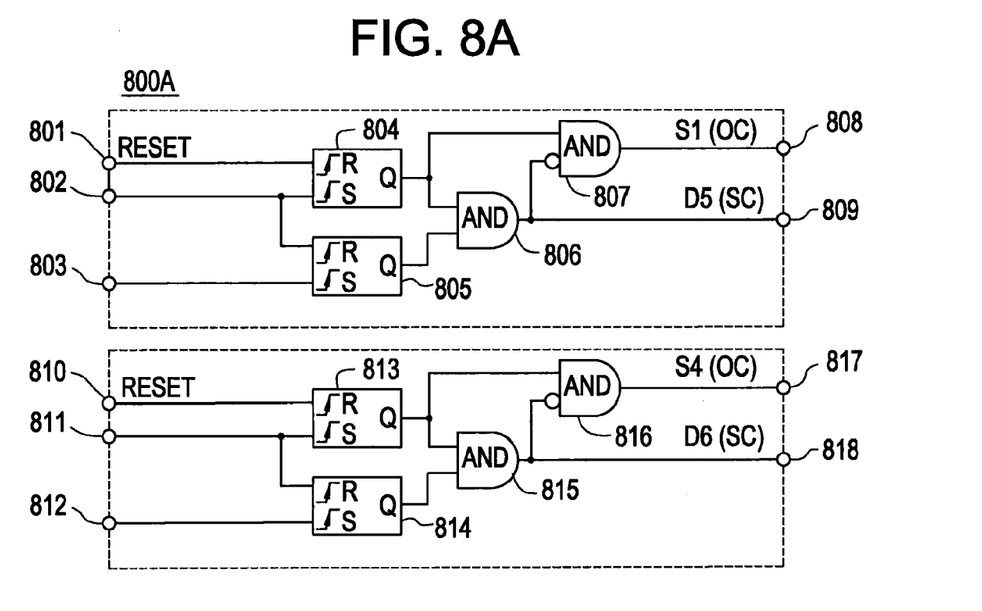
FIGS. 8A-B are a block diagrams of an embodiment of a logic circuit for distinguishing a short circuit fault from an open circuit fault.

FIG. 8A shows an embodiment of a logic circuit 800A that differentiates an outer switch open circuit fault from an NPC diode short circuit fault that may be implemented in a short circuit/open circuit fault detection module 320 in some embodiments. Logic circuit 800A comprises an implementation of EQs. 8-11. In logic circuit 800A of FIG. 8A, a reset signal is received on input 801, $FAULT_{305\_311}$ is received on input 802, and $CLAMP_{311}$ is received on input 803. Edge triggered latches 804 and 805, and AND gates 806 and 807, produce $OC_{311}$ on output 808 and $SC_{305}$ on output 809. Similarly, a reset signal is received on input 810, $FAULT_{306\_314}$ is received on input 811, and $CLAMP_{314}$ is received on input 812. Edge triggered latches 813 and 814, and AND gates 815 and 816, produce $OC_{314}$ on output 817 and $SC_{306}$ on output 818. FIG. 8A is shown for illustrative purposes only; EQs. 8-11 may be implemented in any appropriate type of circuitry to differentiate an outer switch open circuit fault from an NPC diode short circuit fault in the short circuit/open circuit fault detection module 320.

Figure 9A:
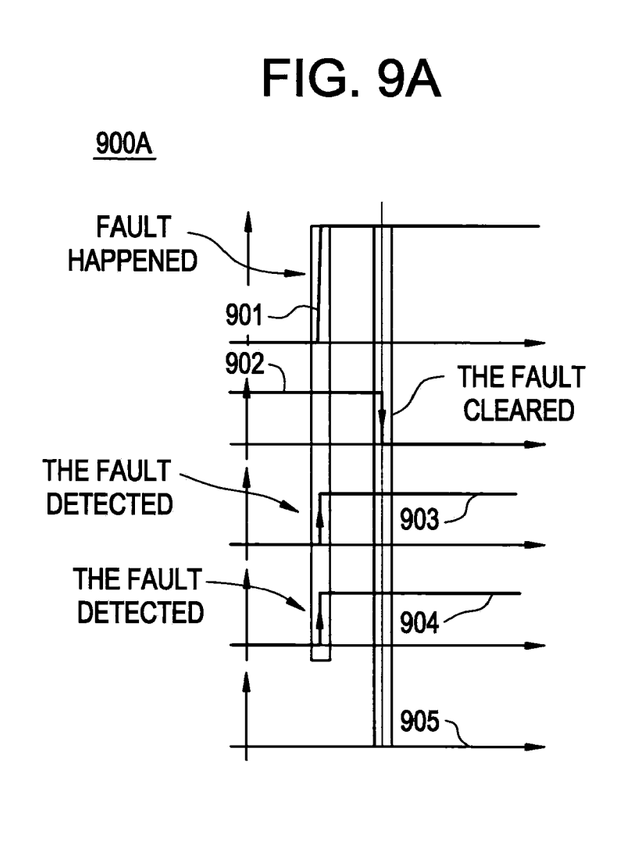
FIGS. 9A-B are timing diagrams of embodiments of the fault detection performed by the logic circuits of FIGS. 8A-B.

An open circuit fault of an inner switch is reflected as full voltage across the faulty inner switch and low voltage across the opposite outer switch. However, the same pattern of signals is detected when the outer switch fails in short circuit. The difference between these two faults is that the opposite inner switch is not desaturated when the inner switch is open circuited. This can be used to distinguish open circuit from short circuit fault. However, this is an ideal case. In a real case, the inner switches may have different saturation current levels. In this case, the opposite inner switch my have higher saturation current and will stay saturated. Therefore, the short circuit fault of the outer switch will be detected as open circuit fault of the inner switch. Short term action to deal with an outer switch short circuit fault and the inner switch open circuit fault, however, is the same: turn the complementary inner switch off. For example, if 311 fails in short circuit, switch 313 is turned off in order to clear the fault. If switch 313 fails in open circuit, no short term action is required, but switch 313 may be turned off without any risk. Therefore, the outer switch short circuit and inner switch open circuit can be treated in the same way, as the outer switch short circuit. Then, once the short term fault has been cleared, the exact fault type can be detected. For example, if switch 311 is short circuited, the fault is detected using $V_{CE\_LOW\_313}$, and generates fault signal $SC_{311}$. However, $SC_{311}$ does not give precise information as to whether a short circuit fault actually exists; there could be an open circuit fault of the complementary switch 313. The fault is cleared by turning the complementary switch 313 off. In meantime, the switch current in switch 311 increases up to saturation level. When the fault is being cleared, the $V_{CE\_LOW\_311}$ will rise up to clamping level, which is defined by the particular gate driver 315A associated with switch 311. The clamping action can be detected from the signal $CLAMP_{311}$. A detailed timing diagram 900A of these signals in the event of a short circuit of switch 311 is shown in FIG. 9A. FIG. 9A shows the action of the following signals: $V_{CE\_LOW\_313}$ (901), the gate input voltage to switch 313 (902), $DESAT_{313}$ (903), short circuit signal $SC_{311}$ (904), and $CLAMP_{313}$ (905).

Figure 9B:
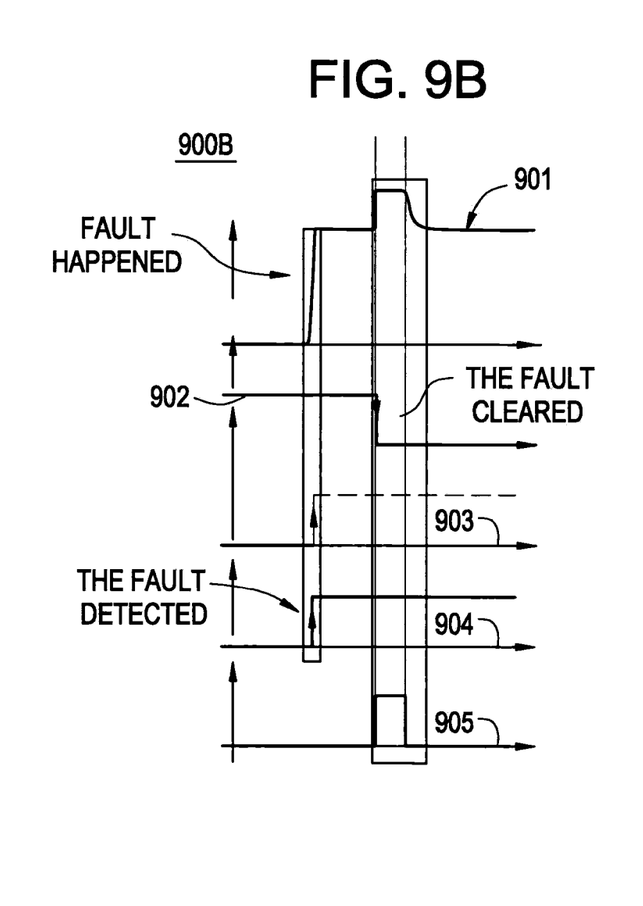

In the case of an open circuit fault of the complementary inner switch 313, the fault can be detected from the desaturation signal $DESAT_{313}$, or low voltage on switch 311 that is indicated by the fault signal $SC_{311}$. However, these two signals cannot guarantee that the fault is properly detected; the fault could be an open circuit of switch 313 or short circuit of switch 311. The fault will be cleared by turning switch 313 off, so no current is present in switch 313. Because switch 313 has been opened, no over-voltage is generated and therefore $CLAMP_{313}$ is inactive. A detailed timing diagram 900B of these signals in the even of an open circuit of switch 313 is shown in FIG. 9B. FIG. 9B shows the action of the following signals: $V_{CE\_LOW\_313}$ (901), the gate input voltage to switch 313 (902), $DESAT_{313}$ (903), short circuit signal $SC_{311}$ (904), and $CLAMP_{313}$ (905).

Therefore, the CLAMP fault signals can be used to distinguish a short circuit fault from an open circuit fault of the complementary switch. The short circuit detection logic is:

$$SC_{311} = FAULT_{311\_313} \& CLAMP_{313} \quad \text{(EQ. 12)}$$

$$SC_{314} = FAULT_{314\_312} \& CLAMP_{312} \quad \text{(EQ. 13)}$$

and the open circuit fault detection logic is:

$$OC_{313} = \neg (SC_{311}) \& FAULT_{311\_313} \quad \text{(EQ. 14)}$$

$$OC_{312} = \neg (SC_{314}) \& FAULT_{314\_312} \quad \text{(EQ. 15)}.$$

Figure 8B:
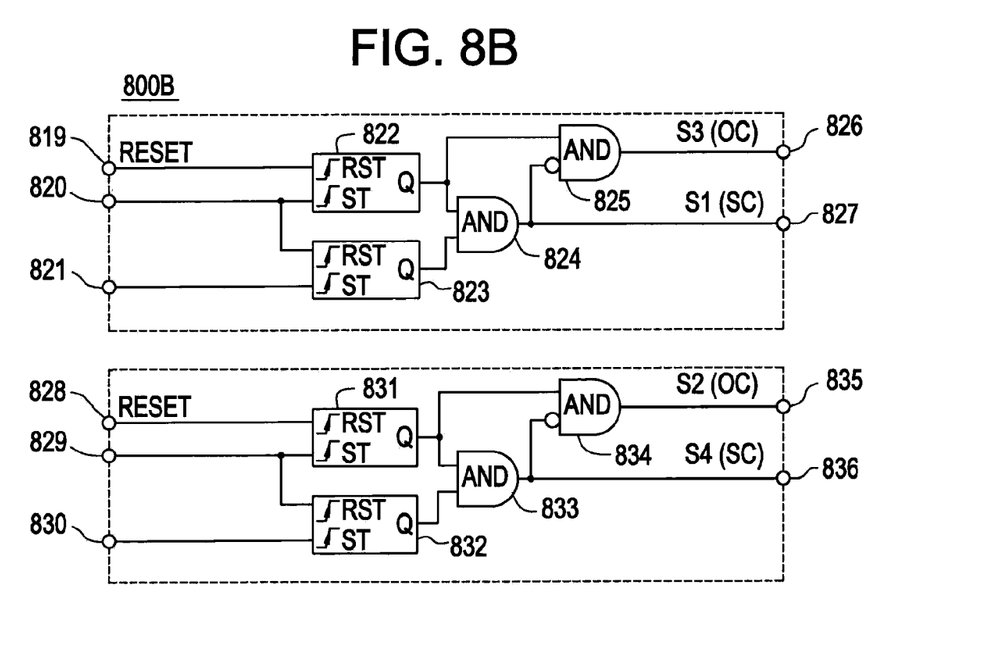

FIG. 8B shows an embodiment of a logic circuit 800 to differentiate an open circuit fault of an inner switch from a short circuit fault of the outer switch that may be implemented in a short circuit/open circuit fault detection module 320 in some embodiments. Logic circuit 800B is an implementation of EQs. 12-15. In logic circuit 800B of FIG. 8B, a reset signal is received on input 819, $FAULT_{311\_313}$ is received on input 820, and $CLAMP_{313}$ is received on input 821. Edge triggered latches 822 and 823, and AND gates 824 and 825, produce $OC_{313}$ on output 826 and $SC_{311}$ on output 827. Similarly, a reset signal is received on input 828, $FAULT_{314\_312}$ is received on input 829, and $CLAMP_{312}$ is received on input 830. Edge triggered latches 831 and 832, and AND gates 833 and 834, produce $OC_{312}$ on output 835 and $SC_{314}$ on output 836. FIG. 8B is shown for illustrative purposes only; EQs. 12-15 may be implemented in any appropriate type of circuitry to differentiate an open circuit fault of an inner switch short circuit fault of the outer switch.

The safety turnoff sequence management module 316 of FIG. 3 is now discussed in detail. The safety turnoff sequence management module 316 receives signals from short circuit/open circuit fault detection module 320, and outputs turn on/off signals to the appropriate gate driver(s) 315A-D to clear a detected fault. The following equations describe the safety turnoff sequence:

$$TURN\_311\_OFF = FAULT_{305\_311} + SC_{313} \quad \text{(EQ. 16)}$$

$$\begin{aligned}TURN\_312\_OFF = &[FAULT_{314\_312} + \\ &(SC_{313} \& FAULT_{311\_313})] \& [\neg \\ &(FAULT_{314\_312} \& SC_{313}) + DELAY \\ &(FAULT_{314\_312} \& SC_{313})]\end{aligned} \quad \text{(EQ. 17)}$$

$$\begin{aligned}TURN\_313\_OFF = &[FAULT_{311\_313} + \\ &(SC_{312} \& FAULT_{314\_312})] \& [\neg \\ &(FAULT_{311\_313} \& SC_{312}) + DELAY \\ &(FAULT_{311\_313} \& SC_{312})]\end{aligned} \quad \text{(EQ. 18)}$$

$$TURN\_314\_OFF = FAULT_{306\_314} + SC_{312} \quad \text{(EQ. 19)}.$$

The logic inputs have been defined in the previous sections. The function DELAY(x) is time delay function, meaning that output is delayed from the input, where delay time is defined depending on the switch turn off delay time. For example, the delay time can be in range of 0.5 μs up to 2 μs.

Figure 10:
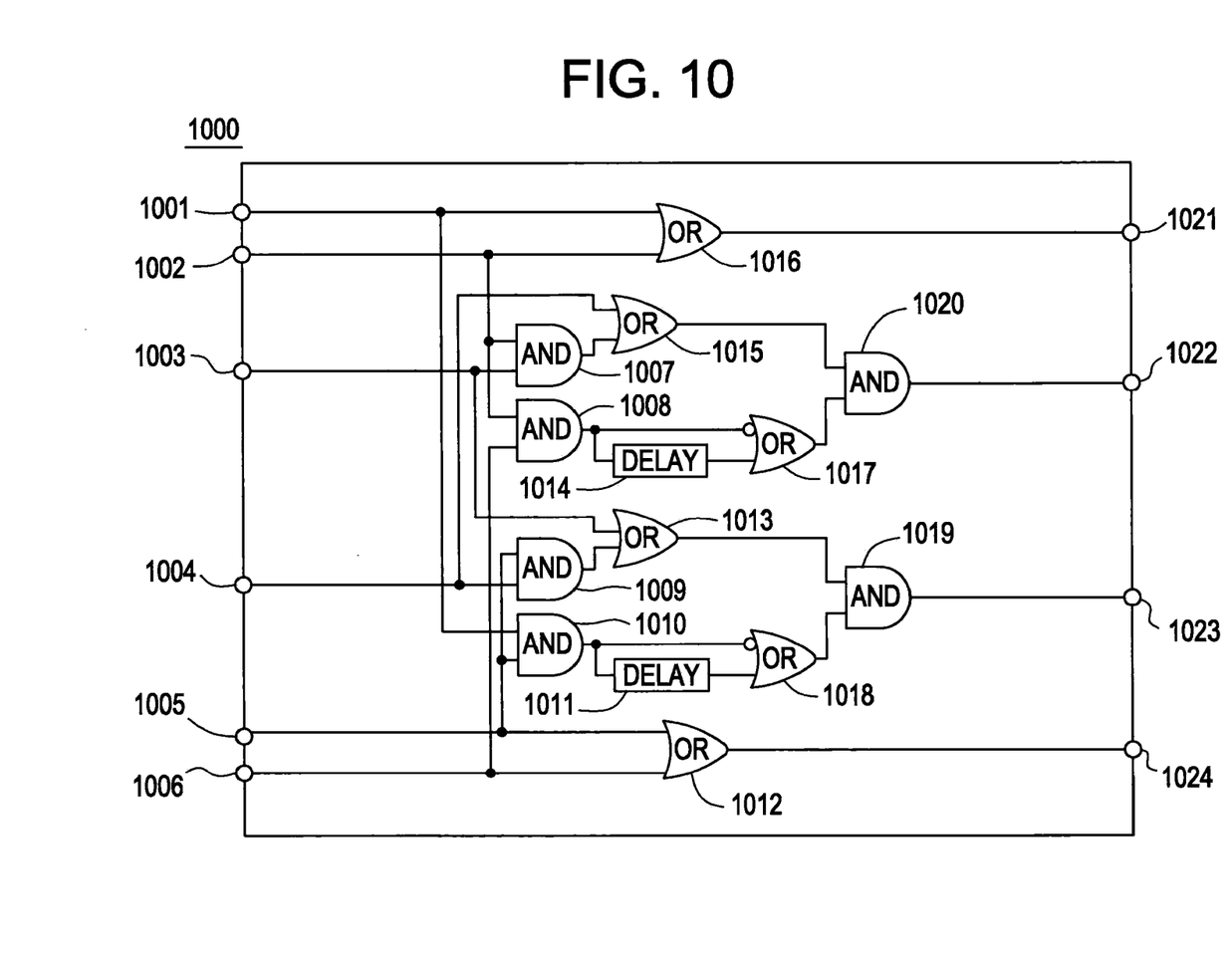
FIG. 10 is a block diagram of an embodiment of a logic circuit for a safety turnoff sequence.

FIG. 10 shows an embodiment of a logic circuit 1000 that performs the safety turn off sequence that may be implemented in safety turnoff sequence management module 316 in some embodiments. Logic circuit 1000 is an implementation of EQs. 16-19. In logic circuit 1000 of FIG. 10, $FAULT_{305\_311}$ is received on input 1001, $SC_{313}$ is received on input 1002, $FAULT_{311\_313}$ is received on input 1003, $FAULT_{314\_312}$ is received on input 1004, $SC_{312}$ is received on input 1005, and $FAULT_{306\_314}$ is received on input 1006.

Logic including AND gates 1007-1010, DELAY modules 1011 and 1014, OR gates 1012-1013 and 1015-1016, and AND gates 1019 and 1020 produce TURN_311_OFF on output 1021, which commands switch 311 to turn off; TURN_312_OFF on output 1022, which commands switch 312 to turn off; TURN_313_OFF on output 1023, which commands switch 313 to turn off; and TURN_314_OFF on output 1024, which commands switch 314 to turn off. Each of the turn off signals on outputs 1021-2024 act to protect the NPC power converter 204 from the fault conditions, and may also be used to turn the output's respective switch on, as needed. FIG. 10 is shown for illustrative purposes only; EQs. 16-19 may be implemented in any appropriate type of circuitry to implement the turnoff sequence.

Further, as was noted above with respect to EQs. 8-11, when a fault of a NPC diode 305/306 or an outer switch 311/314 is indicated by $FAULT_{305\_311}$ or $FAULT_{306\_314}$, the outer switch (311/314) will be turned off immediately. With this action, catastrophic failure is prevented in case of NPC diode short circuit. If the fault is an open circuit fault of the outer switch, nothing will happen in the short term. However, once the fault has been cleared, the exact type of the fault can be determined using the switch CLAMP signal, so that the outer switch may be turned back on by the safety turnoff sequence management module 316 if the fault is an open circuit of the outer switch. This action is given by the following equations:

$$TURN\_311\_ON = OC_{311} \quad (EQ. 20)$$

$$TURN\_314\_ON = OC_{314} \quad (EQ. 21),$$

and may be implemented in the safety turnoff sequence management module 316 in any appropriate manner.

Exemplary embodiments of an electrical fault detection, identification, and protection system for a NPC power converter, and methods of electrical fault detection, identification, and protection for a NPC power converter are described above in detail. These systems and methods are not limited to the specific embodiments described herein, but rather, components of the fault detection, identification, and protection system and/or steps of the methods may be utilized independently and separately from other components and/or steps described herein. For example, the fault detection, identification, and protection system and methods may also be used in combination with an NPC power converter in other any appropriate type of power systems and methods, and are not limited to practice with only the power system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fault detection, identification, and protection system for a neutral point clamped (NPC) power converter, said fault detection, identification, and protection system comprising:
   a phase leg of the NPC power converter, the phase leg comprising two NPC diodes, two inner switches with two associated inner diodes, and two outer switches with two associated outer diodes, each of the inner and outer switches of the phase leg having a respective gate driver, wherein each of the outer switches are connected to a respective bus of the phase leg, and the inner switches are connected in series between the two outer switches;
   a fault detection circuit, the fault detection circuit configured to determine, based on signals received from the two inner switches and two outer switches via their respective gate drivers, the presence of a fault in the phase leg;
   a fault identification circuit, the fault identification circuit being configured to determine, based on signals from the fault detection circuit, a location of the fault in the phase leg; and
   a protection circuit, the protection circuit being configured to turn off at least one of the inner switches or outer switches in response to the identification of the location of the fault by the fault identification circuit.

2. The system of claim 1, wherein the fault detection circuit is configured to detect the presence of a fault comprising one of a short circuit of an NPC diode or an open circuit of an outer switch based on four desaturation signals, each of the four desaturation signals being received from a respective switch of the two inner switches and two outer switches.

3. The system of claim 2, wherein the fault detection circuit is configured to detect the presence of the fault comprising one of a short circuit of an NPC diode or an open circuit of an outer switch further based on a combination of the four desaturation signals plus a time delay.

4. The system of claim 2, wherein the fault identification circuit is configured to determine whether the fault is a short circuit of an NPC diode or an open circuit of an outer switch based on a clamping signal from the outer switch.

5. The system of claim 1, wherein the fault detection circuit is configured to detect the presence of an open circuit of an NPC diode based on a clamping signal of an outer switch.

6. The system of claim 5, wherein the fault detection circuit is configured to detect the presence of the open circuit of an NPC diode based on a pulse width of the clamping signal.

7. The system of claim 1, wherein the fault detection circuit is configured to detect the presence of a short circuit of an inner switch based on a collector emitter voltage of the inner switch and a pulse width modulation (PWM) signal of an outer switch.

8. The system of claim 7, wherein the fault detection circuit is configured to detect the presence of a short circuit of an inner switch further based the pulse width modulation (PWM) signal of the outer switch plus a time delay.

9. The system of claim 1, wherein the fault detection circuit is configured to detect the presence a fault comprising one of a short circuit of an outer switch and an open circuit of an inner switch based on a collector emitter voltage of the outer switch and a PWM signal of an inner switch.

10. The system of claim 9, wherein the fault detection circuit is configured to detect the presence of the fault comprising one of a short circuit of an outer switch and an open circuit of an inner switch further based the pulse width modulation (PWM) signal of the inner switch plus a time delay.

11. The system of claim 9, wherein the fault identification circuit is configured to determine whether the fault is a short circuit of an outer switch or an open circuit of an inner switch based on a clamping signal of the outer switch.

12. The system of claim 1, wherein the protection circuit is configured to turn an outer switch off in the event a fault is detected in an NPC diode or the outer switch.

13. The system of claim 12, wherein the protection circuit is further configured to turn the outer switch back on in the event the fault comprises an open circuit in the outer switch.

14. The system of claim 1, wherein the protection circuit is configured to turn an inner switch off in the event a fault is detected in the inner switch or an outer switch, or in the event a short circuit is detected in the other inner switch and a fault is detected in the other inner switch and the other outer switch, and further based on a signal indicating that a fault is not detected in the inner switch and the outer switch and a short circuit is detected in the other inner switch, plus a delay of the signal.

15. A method for fault detection, identification, and protection system for a phase leg of a NPC power converter, the phase leg comprising two NPC diodes, two inner switches with two associated inner diodes, and two outer switches with two associated outer diodes, each of the inner and outer switches of the phase leg having a respective gate driver, wherein each of the outer switches are connected to a respective bus of the phase leg, and the inner switches are connected in series between the two outer switches, said method for fault detection, identification, and protection comprising:

detecting by a fault detection circuit the presence of a fault in the phase leg based on signals received from the two inner switches and two outer switches via their respective gate drivers;

identifying by a fault identification circuit a location of the fault in the phase leg based on signals from the fault detection circuit; and     turning off at least one of inner switches or outer switches by a protection circuit in response to the identification of the location of the fault by the fault identification circuit.

16. The method of claim 15, further comprising detecting by the fault detection circuit the presence of a fault comprising one of a short circuit of an NPC diode or an open circuit of an outer switch based on four desaturation signals, each of the four desaturation signals being received from a respective switch of the two inner switches and two outer switches.

17. The method of claim 15, further comprising detecting by the fault detection circuit the presence of an open circuit of an NPC diode based on a clamping signal of an outer switch.

18. The method of claim 15, further comprising detecting by the fault detection circuit the presence of a short circuit of an inner switch based on a collector emitter voltage of the inner switch and a pulse width modulation (PWM) signal of an outer switch.

19. The method of claim 15, further comprising detecting by the fault detection circuit the presence a fault comprising one of a short circuit of an outer switch and an open circuit of an inner switch based on a collector emitter voltage of the outer switch and a PWM signal of an inner switch.

20. The method of claim 15, further comprising turning an outer switch off by the protection circuit is configured in the event a fault is detected in an NPC diode or the outer switch; and     turning an inner switch off by the protection circuit in the event in the event a fault is detected in the inner switch or an outer switch, or in the event a short circuit is detected in the other inner switch and a fault is detected in the other inner switch and the other outer switch, and further based on a signal indicating that a fault is not detected in the inner switch and the outer switch and a short circuit is detected in the other inner switch, plus a delay of the signal.

\* \* \* \* \*